(12) United States Patent
Matsumoto et al.

(10) Patent No.: US 8,741,496 B2
(45) Date of Patent: Jun. 3, 2014

(54) FUEL CELL SYSTEM WITH DILUTION AND PURGE CONTROL AND CONTROL METHOD THEREOF

(75) Inventors: Yuji Matsumoto, Wako (JP); Satoshi Aoyagi, Wako (JP); Takuya Shirasaka, Wako (JP); Koichiro Miyata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 857 days.

(21) Appl. No.: 12/078,519

(22) Filed: Apr. 1, 2008

(65) Prior Publication Data

US 2008/0248341 A1    Oct. 9, 2008

(30) Foreign Application Priority Data

Apr. 4, 2007    (JP) .................................. 2007-098828

(51) Int. Cl.
  *H01M 8/04*    (2006.01)
  *H01M 8/06*    (2006.01)
  *H01M 8/10*    (2006.01)

(52) U.S. Cl.
  USPC ........... 429/427; 429/415; 429/430; 429/454; 429/505

(58) Field of Classification Search
  USPC .................. 429/412, 415, 427, 430, 454, 505
  See application file for complete search history.

(56) References Cited

U.S. PATENT DOCUMENTS

| 2004/0106021 A1* | 6/2004 | Kanai et al. ...................... 429/22 |
| 2005/0064258 A1* | 3/2005 | Fredette .......................... 429/22 |
| 2005/0106424 A1* | 5/2005 | Elhamid et al. .................... 429/9 |
| 2005/0277004 A1* | 12/2005 | Ojima et al. ..................... 429/22 |
| 2007/0059569 A1* | 3/2007 | Matsumoto et al. ............. 429/22 |

FOREIGN PATENT DOCUMENTS

| JP | 07-235324 | 9/1995 |
| JP | 2001-359204 | 12/2001 |
| JP | 2003317775 A * | 11/2003 |
| JP | 2004179100 A * | 6/2004 |
| JP | 2005-353360 A | 12/2005 |
| JP | 2006139939 A | 6/2006 |
| JP | 2007080562 A | 3/2007 |
| WO | WO 2006064893 A2 * | 6/2006 |

OTHER PUBLICATIONS

Uoshima et al., Machine translation of JP 2004179100 A, Jun. 2004.*
Nishio et al., Machine translation of JP 2003-317775 A, Nov. 2003.*
Japanese Notice of Reasons for Rejection for JP application No. 2007-098828 mailed Feb. 5, 2013.
Japanese Office Action dated May 29, 2012 in corresponding JP2007098828.

* cited by examiner

*Primary Examiner* — Sean P Cullen
(74) *Attorney, Agent, or Firm* — Squire Sanders (US) LLP

(57) ABSTRACT

The object of the present invention is to provide a fuel cell system enabling an improvement in fuel consumption and a method for controlling thereof. A fuel cell system 1 includes a fuel cell 10, an air pump 21, an air supply channel, a hydrogen supply channel, a hydrogen tank, a hydrogen discharge channel, a hydrogen reflux channel, an air discharge channel, a purge valve 441, and a control device 30. The control device 30 includes a dilution judgment portion 31 judging whether dilution of hydrogen gas has been completed; an air increase portion 33 for increasing an air mass in the air discharge channel; a power production calculation portion 34 calculating an amount of power production based on the air mass increased; and a fuel cell drive portion 35 driving the fuel cell 10 to produce electric power to obtain the amount of power production calculated.

6 Claims, 6 Drawing Sheets

FUEL CELL SYSTEM WITH DILUTION AND PURGE CONTROL AND CONTROL METHOD THEREOF

This application is based on and claims the benefit of priority from Japanese Patent Application No. 2007-098828, filed on 4 Apr. 2007, the content of which is incorporated herein by reference.

BACKGROUND OF THE INVENTION

1. Field of the Invention

The present invention relates to a fuel cell system and a control method thereof. More specifically, it relates to a fuel cell system provided on a vehicle and a control method thereof.

2. Related Art

Recently, fuel cell systems have drawn attention as new sources of power that can be used to drive vehicles. For example, a fuel cell system can be provided with a fuel cell producing electric power from chemical reactions of reactive gas, a reactive gas supply device supplying reactive gas to the fuel cell through a reactive gas channel, and a control device controlling the reactive gas supply device.

The fuel cell can be structured to include a plurality (e.g., tens or hundreds) of stacked cells. Each cell is configured by holding a membrane electrode assembly (MEA) between a pair of plates. The MEA is configured with two electrodes, such as an anode (i.e. a positive electrode) and a cathode (i.e. a negative electrode), and a solid polymer electrolyte membrane held between these electrodes.

Supplying hydrogen gas as reactive gas to the anode of the fuel cell and oxygenated air as reactive gas to the cathode of the fuel cell, produces an electrochemical reaction from which the fuel cell produces electric power.

In the abovementioned fuel cell system, the amount of air (air mass) in which electric power can be produced in the highest efficiency is predetermined based on the required amount of power production. When the predetermined power production is required, an air mass is supplied to the fuel cell in the amount predetermined based on this required power production.

Incidentally, for stable electric power production by a fuel cell system, hydrogen gas in a reactive gas channel is discharged (hereinafter referred to as "purged"). This purged hydrogen gas is diluted in air in the reactive gas channel, and then discharged (for example, Japanese Unexamined Patent Application Publication No. H07-235324).

In addition, a method for stopping electric power production of the fuel cell by an idling stop to improve fuel consumption of the fuel cell vehicle is disclosed (Japanese Unexamined Patent Application Publication No. 2001-359204).

Incidentally, when a stop command signal for the fuel cell is input by an idling stop during or immediately after purge, the following phenomena occur.

FIG. 6 is a timing chart for until the fuel cell stops after the stop command signal for the fuel cell is input.

As shown in FIG. 6, a current request value is reduced when the stop command signal for the fuel cell is input by idling stop. As a result, current is reduced, and then the speed of the fuel cell vehicle is reduced. With the reduced current request value, the air mass required for electric power production is also reduced.

However, since a purge flag is set in order to perform purge at the same time of idling stop air mass required for diluting hydrogen gas is increased.

Accordingly, there is a problem in that the air mass required for electric power production is decreased by idling stop, but the air mass required for accelerating to dilute the purged hydrogen gas is increased in order to stop the fuel cell system immediately. Thus, the requested value of air mass for the system is more than the air mass required for electric power production. As a result, the air mass wastefully supplied to the system is increased, and then power generation efficiency decreases, whereby fuel consumption is reduced.

SUMMARY OF THE INVENTION

The object of the present invention is to provide a fuel cell system enabling an improvement in fuel consumption and a control method.

The fuel cell system of the present invention is characterized by including: a fuel cell (e.g., a fuel cell 10) producing electric power by the reaction of hydrogen gas and air; an air supply means (e.g., an air pump 21 and air supply channel 41) for supplying air to the fuel cell; a hydrogen gas supply means (e.g., a hydrogen tank 22) for supplying hydrogen gas to the fuel cell through a hydrogen supply channel (e.g., a hydrogen supply channel 43); a hydrogen circulation channel (e.g., a hydrogen discharge channel 44 and hydrogen reflux channel 45) in which hydrogen gas discharged from the fuel cell is introduced into the hydrogen supply channel again; an air discharge channel (e.g., an air discharge channel 42) in which air discharged from the fuel cell flows; a purge means (e.g., a purge valve 441) by which hydrogen gas in the hydrogen supply channel and the hydrogen circulation channel flows into air in the air discharge channel; and a control means (e.g., a control device 30) for controlling the air supply means, the hydrogen supply means, and the purge means, in which the control means includes: a dilution judgment means (e.g., a dilution judgment portion 31) for judging whether or not the purge means has completed dilution of the hydrogen gas in the hydrogen supply channel and the hydrogen circulation channel when a stop signal for the fuel cell is input; an air increase means (e.g., an air increase portion 33) for increasing air mass in the air discharge channel by the air supply means when the dilution judgment means judges that the dilution has not been completed; a power production calculation means (e.g., a power production calculation portion 34) for calculating an amount of the power production of the fuel cell based on the air mass increased by the air increase means; and a fuel cell drive means (e.g., a fuel cell drive portion 35) for driving the fuel cell to produce electric power so as to obtain the amount of the power production calculated by the power production calculation means.

According to the present invention, when a signal for stopping the fuel cell is input due to an idling stop, and purge is performed, it is judged whether or not dilution of hydrogen gas in the hydrogen supply channel and the hydrogen circulation channel has been completed. When it is judged that the dilution has not been completed, the air mass in the air discharge channel is increased to accelerate the dilution of the purged hydrogen gas. Meanwhile, the increased air mass is calculated, the power production of the fuel cell is calculated based on this increased air mass, and then the fuel cell is driven to produce electric power so as to obtain this calculated total power production. Therefore, air is not supplied wastefully, and fuel consumption can be prevented from deteriorating.

In this case, it is preferable to include an electrical storage means (e.g., a battery 11) for storing electric power produced by the fuel cell. The control means includes: an electrical storage judgment means (e.g., an electrical storage judgment portion 36) for judging whether or not the electrical storage means is possible to store electric power, and in which the electric power produced by the fuel cell drive means is stored in the electrical storage means when the electrical storage judgment means judges that the electrical storage means is possible to store the electric power.

According to the present invention, the electric power produced by the fuel cell is stored in the electrical storage means when it is judged that the electrical storage means can store the electric power. Therefore, electric power can be effectively utilized by storing unnecessary electric power in the electrical storage means, even if the fuel cell produces electric power based on the increased air mass regardless of the required amount of electric power.

A method for controlling the fuel cell system of the present invention includes the fuel cell system having a fuel cell producing electric power by the reaction of hydrogen gas and air, a hydrogen supply means for supplying hydrogen gas to the fuel cell through a hydrogen supply channel, a hydrogen circulation channel in which hydrogen gas discharged from the fuel cell is introduced into the hydrogen supply channel again, and an air discharge channel in which air discharged from the fuel cell flows, in which the method includes steps of: judging whether a dilution process has been completed or not, in the dilution process hydrogen gas in the hydrogen supply channel and the hydrogen circulation channel flowing into air in the air discharge channel when a stop signal for the fuel cell is input; increasing air mass in the air discharge channel by increasing air which is to be supplied to the fuel cell when it is judged that the dilution process has not been completed; calculating an amount of power production of the fuel cell based on an amount of air mass increased; and driving the fuel cell to produce electric power so as to obtain the amount of power production calculated.

According to the present invention, there is an effect similar to that described above.

According to the present invention, when a signal for stopping the fuel cell is input for idling stop, and purge is performed, it is judged whether or not dilution of hydrogen gas in the hydrogen supply channel and the hydrogen circulation channel has been completed. When it is judged that the dilution has not been completed, the air mass in the air discharge channel is increased to accelerate the dilution of the purged hydrogen gas. Meanwhile, the increased air mass is calculated, the power production of the fuel cell is calculated based on this increased air mass, and then the fuel cell is driven to produce electric power so as to obtain the calculated power production. Therefore, air is not supplied wastefully, and fuel consumption can be prevented from deteriorating.

DETAILED DESCRIPTION OF THE INVENTION

Figure 1:
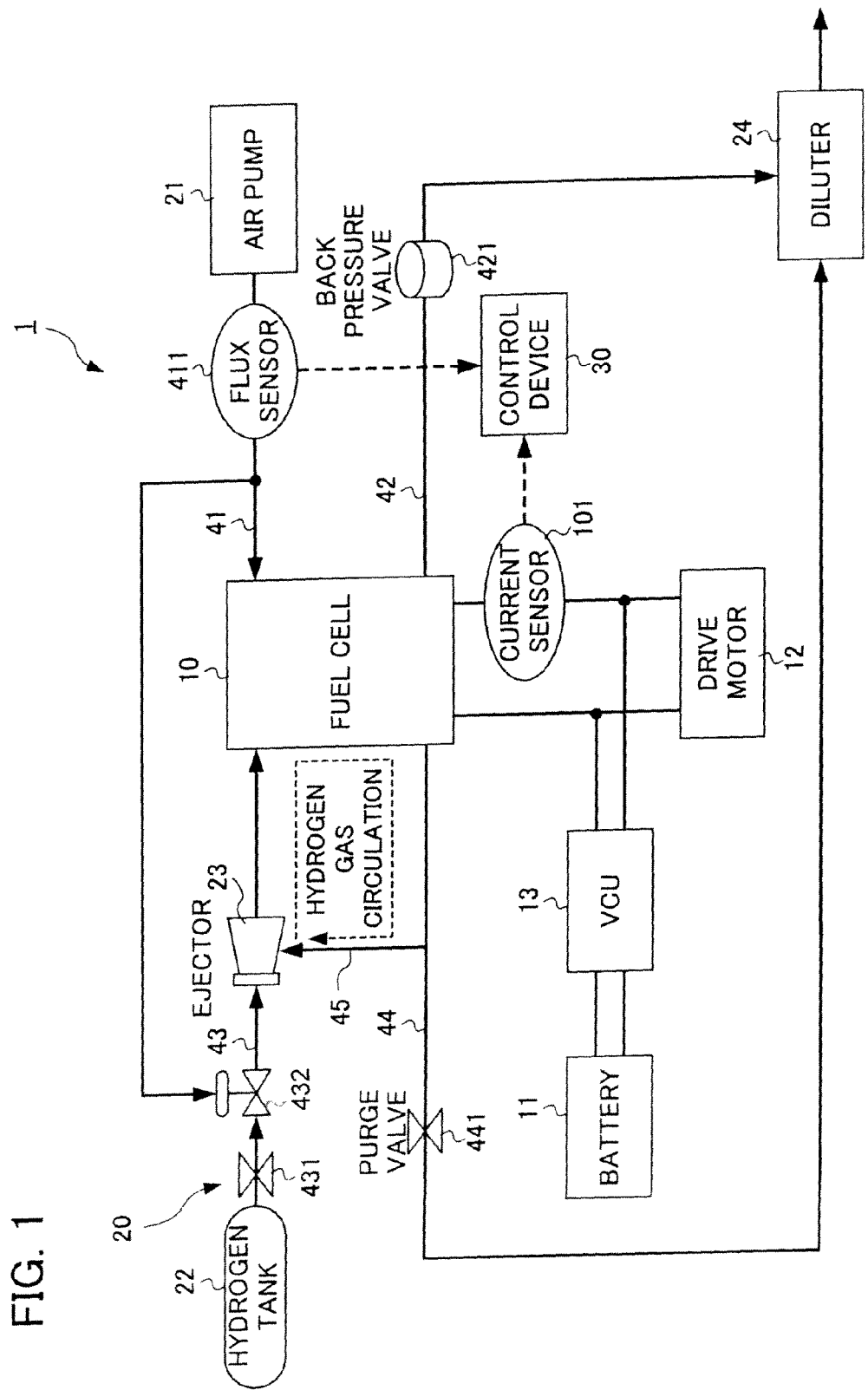
FIG. 1 is a block diagram showing a fuel cell system according to one embodiment of the present invention.

Referring to the drawings, one embodiment of the present invention is described hereafter.

FIG. 1 is a block diagram of a fuel cell system 1 according to one embodiment of the present invention.

The fuel cell system 1 includes a fuel cell 10 producing power by reacting reactive gas, a supply device 20 supplying hydrogen gas and air to the fuel cell 10, a battery 11 as the electrical storage means enabling the storage electric power, and a control device 30 as a control means for controlling the fuel cell 10, the supply device 20, and the battery 11. Among these, the battery 11 and the fuel cell 10 are connected to a drive motor 12 driving a fuel cell powered vehicle.

Supplying hydrogen gas to the anode (positive electrode) and oxygenated air to the cathode (negative electrode), the fuel cell produces electric power by an electrochemical reaction.

The supply device 20 is configured by including an air pump 21 as the air supply means for supplying air to the cathode side of the fuel cell 10, a hydrogen tank 22 and an ejector 23 as the hydrogen gas supply means for supplying hydrogen gas to the anode side thereof, and a diluter 24 processing gas discharged from the fuel cell 10.

The air pump 21 is connected to the cathode side of the fuel cell 10 through an air supply channel 41. A flow sensor 411 is provided in the air supply channel 41 to measure the flux of air flowing in the air supply channel 41.

An air discharge channel 42 as the air discharge channel is connected to the cathode side of the fuel cell 10 to discharge air utilized by the fuel cell 10. The abovementioned diluter 24 is provided at the middle of the air discharge channel 42. In addition, a back pressure valve 421 is provided closer to the fuel cell 10 than the diluter 24 along the air discharge channel 42.

The hydrogen tank 22 is connected to the anode side of the fuel cell 10 through a hydrogen supply channel 43 as the hydrogen supply channel. The aforementioned ejector 23 is provided in the hydrogen supply channel 43. An isolation valve 431 is provided between the hydrogen tank 22 and the ejector 23 along the hydrogen supply channel 43. This isolation valve 431 is kept opening during idling stop.

A regulator 432 is provided closer to the fuel cell 10 than the isolation valve 431 along the hydrogen supply channel 43. The opening of the regulator 432 is changed depending on the pressure of the air supply channel 41, by which the pressure of hydrogen gas flowing in the hydrogen supply channel 43 is adjusted.

A hydrogen discharge channel 44 as the hydrogen circulation channel is connected to the anode side of the fuel cell 10 and also to the diluter 24. A purge valve 441 is provided at the end side of the hydrogen discharge channel 44. The hydrogen discharge channel 44, which is closer to the fuel cell side than the purge valve 441, is branched to become the hydrogen reflux channel 45 as the hydrogen reflux channel that connects to the ejector 23.

The hydrogen discharge channel 44 is provided with a purge valve 441 as the purge means. By opening this purge valve 441, hydrogen in the hydrogen supply channel 43, the hydrogen discharge channel 44, and the hydrogen reflux channel 45 flows into air from the air discharge channel 42 in the diluter 24.

The ejector 23 collects hydrogen gas flowing into the hydrogen discharge channel 44 through the hydrogen reflux channel 45, and directs the hydrogen gas to flow back to the hydrogen supply channel 43.

The fuel cell 10 is connected to a battery 11 and a drive motor 12 through a voltage control device (VCU) 13. In addition, the fuel cell 10 is provided with a current sensor 101 measuring current produced by the fuel cell 10.

Electric power produced by the fuel cell 10 is supplied to the battery 11 and the drive motor 12. The voltage control device (VCU) 13 supplies output from the fuel cell 10 to the battery 11 and the drive motor 12 along with controlling the output as required.

When the voltage of the battery 11 is lower than the output voltage of the fuel cell 10, the battery 11 stores electric power produced by the fuel cell 10. On the other hand, electric power is supplied to the drive motor 12 as required to assist driving of drive motor 12.

The control device 30 controls the abovementioned battery 11, the drive motor 12, the voltage control device 13, the air pump 21, the back pressure valve 421, the isolation valve 431, and the purge valve 441. Furthermore, the current sensor 101 and the flow sensor 411 are connected to the control device 30.

Figure 2:
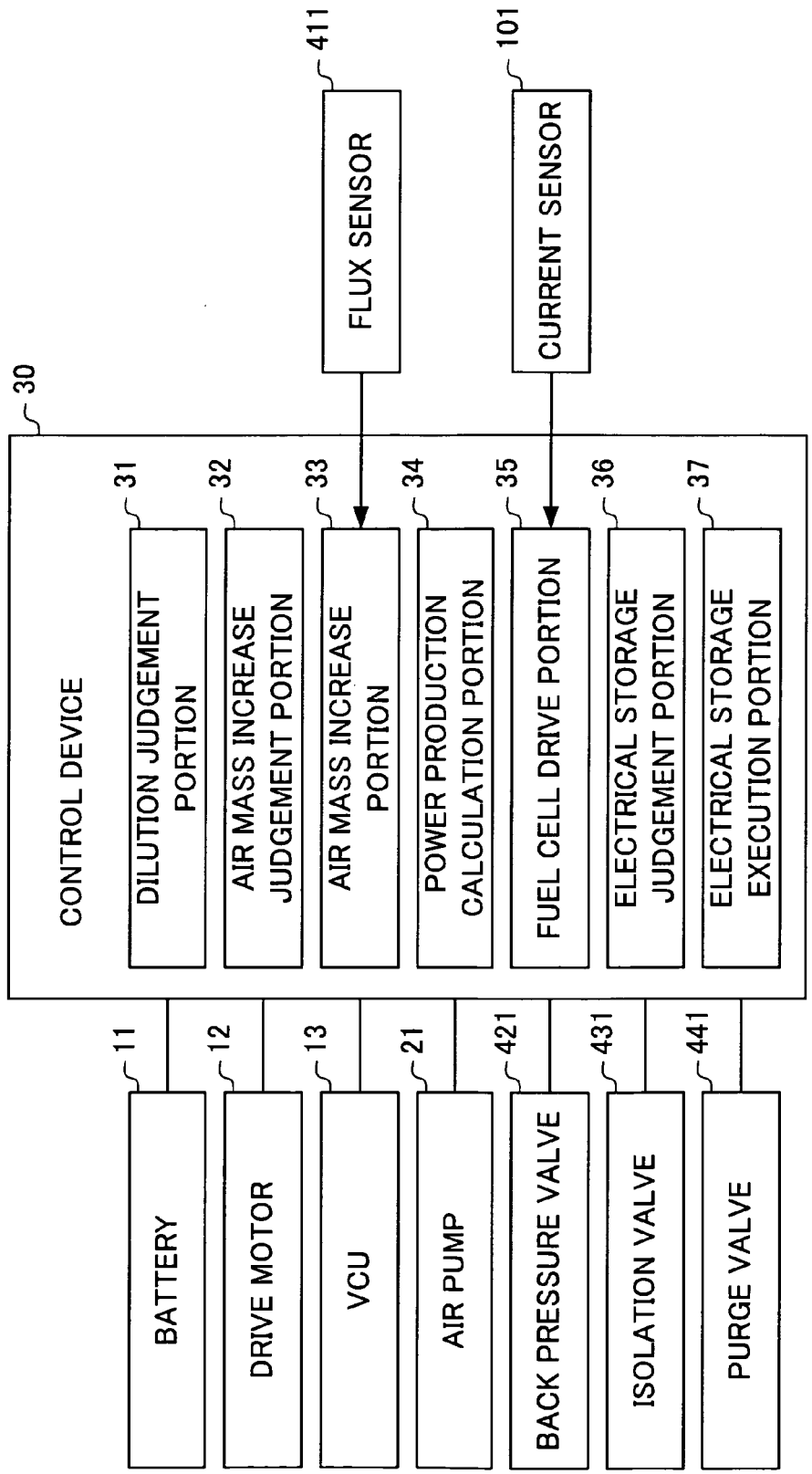
FIG. 2 is a block diagram of a control means of the fuel cell system of the embodiment.

FIG. 2 shows a block diagram of the control device 30.

The control device 30 has a dilution judgment portion 31 as the dilution judgment means, an air increase judgment portion 32, an air increase portion 33 as the air increase means, a power production calculation portion 34 as the power production calculation means, a fuel cell drive portion 35 as the fuel cell drive means, an electrical storage judgment portion 36 as the electrical storage judgment means, and an electrical storage performance portion 37.

The dilution judgment portion 31 judges whether or not the purge valve 441 has completed dilution of the hydrogen gas in the hydrogen supply channel 43 and the hydrogen circulation channel 44 and 45 when a stop signal for the fuel cell is input.

Specifically, the dilution judgment portion 31 judges that the dilution of hydrogen gas has not been completed in a case where it is immediately after a start that the purge valve 441 starts purging at the time when the stop signal for the fuel cell is input. In addition, when the purge is being performed or the purge has been completed at the time of input of the stop signal for the fuel cell 10, the dilution judgment portion 31 judges whether or not the dilution of hydrogen gas has been completed by timing the elapsed time after the purge was previously completed with a timer and measuring the concentration of hydrogen gas with a concentration sensor.

The air increase judgment portion 32 calculates the air-mass required for diluting hydrogen gas (hereinafter referred to as air mass for dilution) when the dilution judgment portion 31 judges that the dilution is not completed. In addition, the air increase judgment portion 32 calculates the air mass required for electric power production of a current request value, and then judges whether or not the air mass for dilution is more than the air mass required for electric power production of the current request value. If this judgment is "Yes", then the air increase portion 33 is driven.

Figure 3:
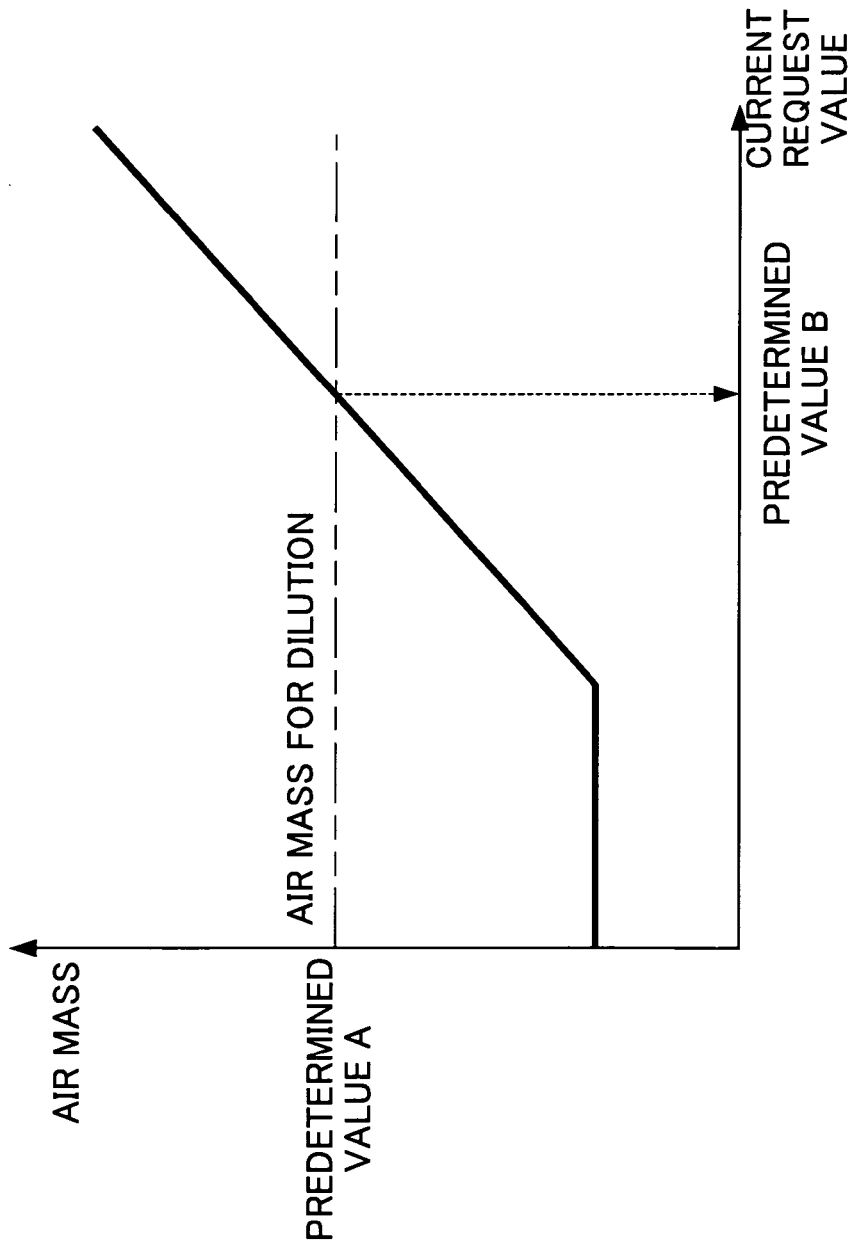
FIG. 3 is a diagram showing the relationship between the current request value and the air mass based thereon in the fuel cell system according to the embodiment.

FIG. 3 is a diagram showing the relationship between the current request value and the air mass based thereon. As shown in FIG. 3, the air mass based on the current request value is constant, even when the current request value increases from 0 to a predetermined value, but it is increased as the current request value increases after the current request value exceeds this predetermined value.

In FIG. 3, the air mass for dilution is represented by the two point dotted line. The air mass for dilution is constant in the predetermined value A, by which current produced with a predetermined value A of air mass for dilution has the predetermined value B.

The air increase portion 33 drives the air pump 21 to increase the air mass of the air discharge channel 42. Specifically, while the air mass of air supply channel 41 is monitored with the flow sensor 411, the air mass determined as the air mass for dilution is supplied to the air discharge channel 42 by increasing the air mass to be supplied.

The power production calculation portion 34 calculates the power production of the fuel cell 10 based on the air mass (i.e. air mass for dilution) increased by the air increase portion 33. In FIG. 3, the air mass for dilution is the predetermined value A, by which the current produced with a predetermined value A of the air mass for dilution has the predetermined value B.

The fuel cell drive portion 35 drives the supply device 20 while monitoring power production with the current sensor 101, by which the fuel cell drive portion 35 drives the fuel cell 10 to produce electric power so as to obtain the predetermined power production. Specifically, regardless of the current request value, the fuel cell drive portion 35 drives the fuel cell 10 to produce electric power, so as to obtain the power production calculated by the power production calculation portion 34, or as to set the power production calculated by the power production calculation portion 34.

The procedure to drive the fuel cell 10 to produce electric power by the fuel cell drive portion 35 is described below.

That is, the isolation valve 431 is opened while the purge valve 441 is closed. Hydrogen gas is supplied from the hydrogen tank 22 to the anode side of the fuel cell 10 through the hydrogen supply channel 43. On the other hand, air is supplied to the cathode side of the fuel cell 10 through the air supply channel 41 by driving the air pump 21.

The hydrogen gas and air supplied to the fuel cell 10 are used for producing electric power, and then flow into the hydrogen discharge channel 44 and air discharge channel 42, respectively, along with any residual water that is generated on the anode side. At this time, since the purge valve 441 is closed, hydrogen gas flowing through the hydrogen discharge channel 44 flows back to the ejector 23 and is reused.

Afterwards, hydrogen gas, air, and any residual water flow from the hydrogen discharge channel 44 and the air discharge channel 42 into the diluter 24 by opening the purge valve 441 and the back pressure valve 421 to an appropriate degree. Hydrogen gas is diluted in air in the diluter 24, and then discharged to the atmosphere.

The electrical storage judgment portion 36 judges whether or not the battery 11 can store electric power.

The electrical storage performance portion 37 stores electric power produced in the fuel cell drive portion 35 in the battery 11 when the electrical storage judgment portion 36 has judged that the electrical storage means can store electric power.

Figure 4:
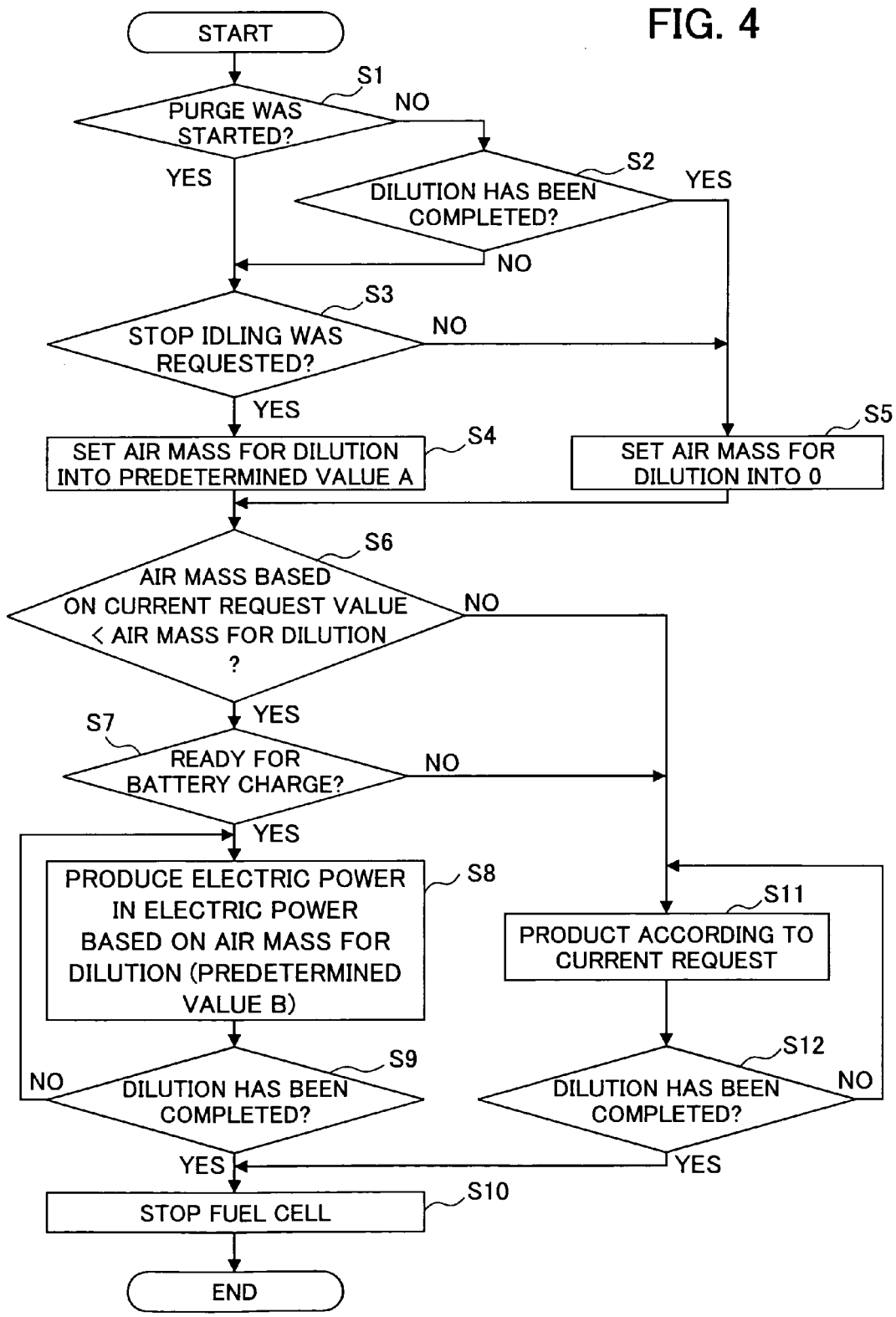
FIG. 4 is a flowchart of a behavior in the fuel cell system according to the embodiment.

The operation of the fuel cell system 1 is described with reference to the flowchart of FIG. 4.

At first, the dilution judgment portion 31 judges whether or not purge has been started (S1). If this judgment is "Yes", then the process moves to S3 because it is clear that the dilution of hydrogen gas has not been completed since it is immediately after that the purge had started.

If the judgment is "No" in S1, then it is judged whether or not the dilution of hydrogen is complete (S2). If this judgment is "No", then the process moves to S3.

In S3, it is judged whether or not idling stop has been requested. If this judgment is "Yes", the dilution of hydrogen gas in the hydrogen supply channel 43 and the hydrogen circulation channel 44 and 45 is not completed even though a stop signal for the fuel cell 10 has been input by idling stop. Thus, the air increase judgment portion 32 sets the air mass for dilution to the predetermined value A (S4), and then the process moves to S6.

If the judgment is "Yes" in S2 and the judgment is "No" in S3, the dilution of hydrogen gas is completed or is not required. Thus, the air mass for dilution is set into 0 (S5), and then the process moves to S6.

In S6, the air increase judgment portion 32 calculates the air mass required for electric power production based on the current request value, and then judges whether or not this calculated air mass is less than the air mass for dilution.

If this judgment is "Yes", the electrical storage judgment portion 36 judges whether or not the battery 11 can be charged. If this judgment is "Yes", the power production calculation portion 34 calculates the power production based on the air mass for dilution (i.e. the predetermined value B) and produces a predetermined value B of current, the storage performance portion 37 stores electric power in the battery 11 (S8), and then the process moves to S9.

In S9, the dilution judgment portion 31 judges whether or not the dilution of hydrogen has been completed. If this judgment is "No", then the process returns to S8. If this judgment is "Yes", then the fuel cell 10 is stopped (S10).

If this judgment is "No" in S6, it is not necessary to increase the air mass. Thus, electric power is produced according to the current request value (S11), and then the process moves to S12. If this judgment is "No" in S7, even if the air mass is increased and electric power is produced based on this increased power production, it results in that this produced electric power cannot be only stored, but only wasted. Thus, electric power is produced according to the current request value (S11), and then the process moves to S12.

In S12, the dilution judgment portion 31 judges whether or not the dilution of hydrogen has been completed. If this judgment is "No", then the process returns to S11. If this judgment is "Yes", then the fuel cell 10 is stopped (S10).

Figure 5:
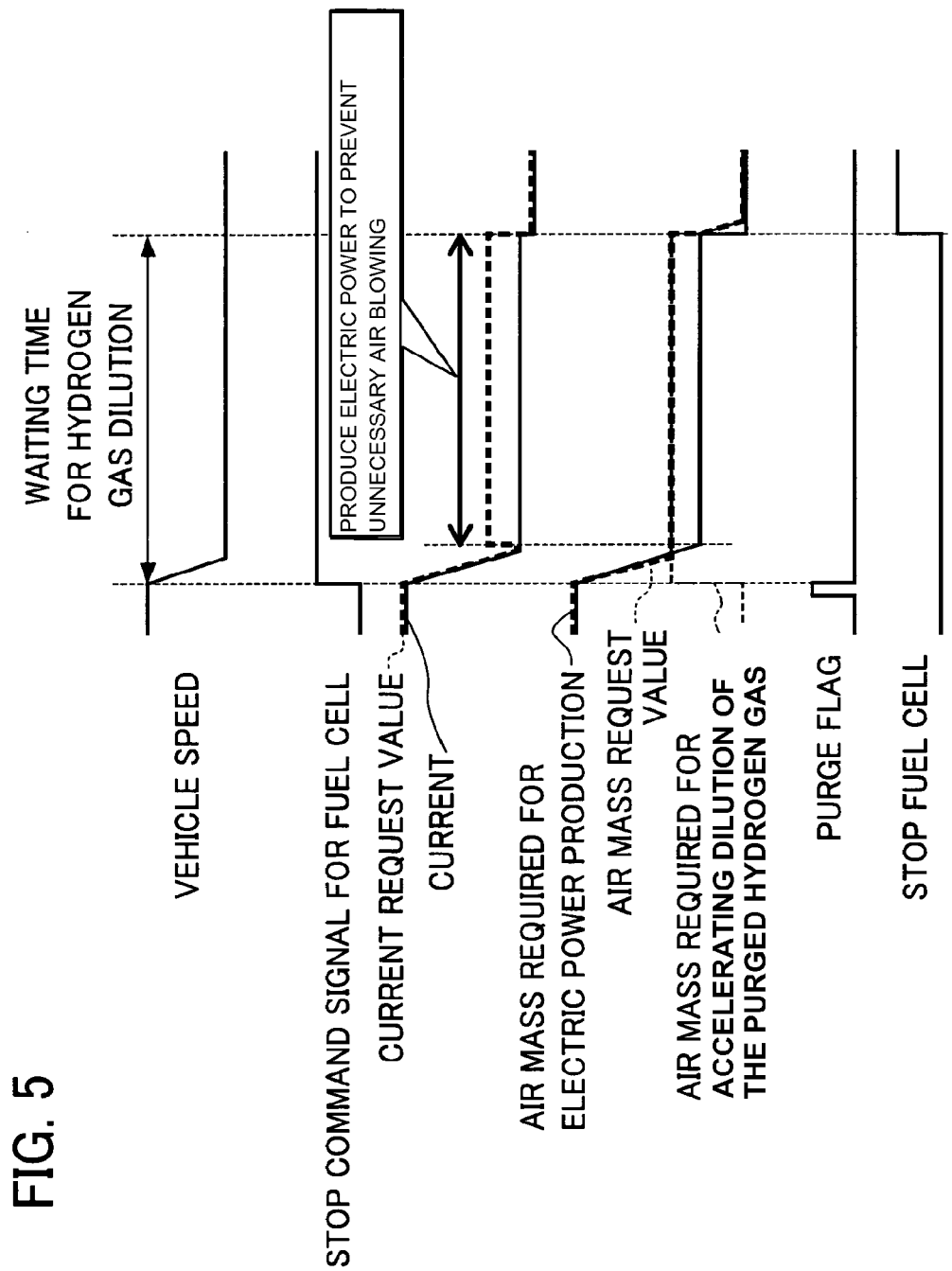
FIG. 5 is a timing chart for until the fuel cell stops after a stop command signal for the fuel cell is input in the fuel cell system according to the one embodiment.
Figure 6:
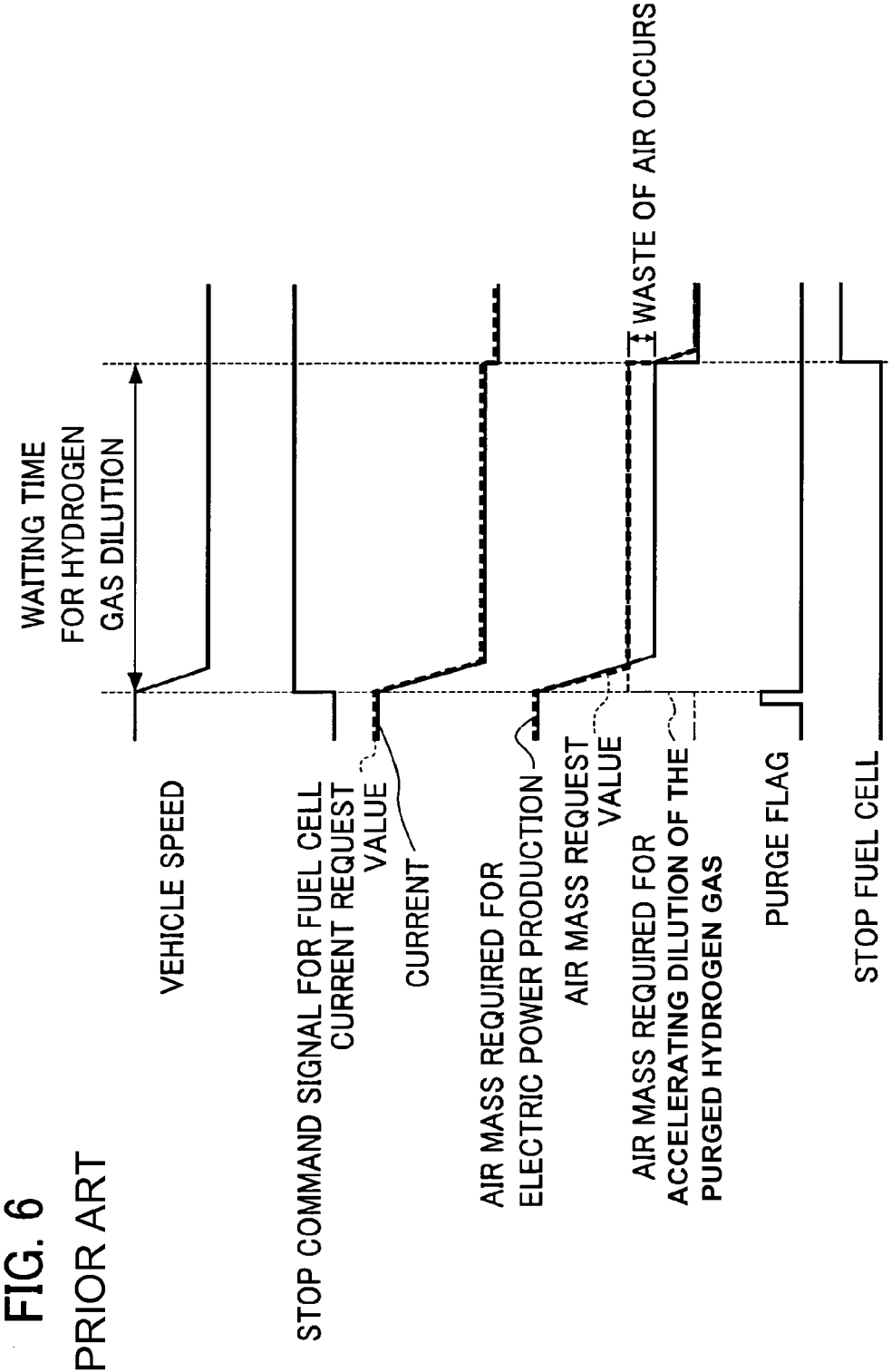
FIG. 6 is a timing chart for until the fuel cell stops after a stop command signal for the fuel cell is input in the fuel cell system according to a conventional example.

FIG. 5 is a timing chart up until the fuel cell stops after a stop command signal for the fuel cell has been input.

As shown in FIG. 5, the current request value is decreased when the stop command signal for the fuel cell is input by idling stop. As a result, current is reduced, and then the speed of the fuel cell vehicle is reduced. With the reduced current request value, the air mass required for electric power production is reduced.

However, since a purge is performed at the same time of idling stop, thereby setting a purge flag to on, the air mass required for diluting hydrogen gas is increased.

Accordingly, the air mass required for electric power production is decreased by idling stop, but the air mass required for accelerating dilution of the purged hydrogen gas is increased in order to stop the fuel cell system immediately. Thus, the request value of the air mass for the system is set to the air mass required for dilution, and further the current request value is increased based on this air mass to prevent air to be supplied to the system from being wasted.

This embodiment produces the following effects:

(1) When a signal for stopping the fuel cell is input for idling stop, and purge is performed, it is judged whether or not dilution of hydrogen gas in the hydrogen supply channel 43, the hydrogen discharge 44, and the hydrogen circulation channel 44 and 45 has been completed. When it is judged that the dilution has not been completed, the air mass in the air discharge channel 42 is increased to accelerate the dilution of the purged hydrogen gas. Meanwhile, the increased air mass is calculated, an amount of power production of the fuel cell 10 is calculated based on this increased air mass, and then the fuel cell 10 is driven to produce electric power so as to obtain this amount of calculated power production. Therefore, air is not supplied wastefully, and fuel consumption can be prevented from deteriorating.

(2) Electric power produced by the fuel cell 10 is stored in the battery 11 when it is judged that the battery 11 is possible to store electric power. Therefore, regardless of the amount of the required electric power, electric power can be effectively utilized by storing unnecessary electric power in the battery 11, even if the fuel cell 10 produces electric power based on the increased air mass.

While a preferred embodiment of the present invention has been described and illustrated above, it is to be understood that the preferred embodiment is exemplary of the invention and is not to be considered to be limiting.

What is claimed is:

1. A fuel cell system comprising:
   a fuel cell producing electric power by a reaction of hydrogen gas and air;
   an air supply means for supplying the air to the fuel cell;
   a hydrogen supply means for supplying the hydrogen gas to the fuel cell through a hydrogen supply channel;
   a hydrogen circulation channel in which the hydrogen gas discharged from the fuel cell is introduced into the hydrogen supply channel again;
   an air discharge channel in which the air discharged from the fuel cell flows;
   a purge means for purging the hydrogen gas in the hydrogen supply channel and the hydrogen circulation channel flow into the air in the air discharge channel;
   an electrical storage means for storing the electric power produced by the fuel cell; and
   a control means for controlling the air supply means, the hydrogen supply means, the purge means, and the electrical storage means,
   wherein the control means is programmed to:
   judge, with a dilution judgment means, whether the purge means has completed dilution of the hydrogen gas, in which the hydrogen gas in the hydrogen supply channel and the hydrogen circulation channel flows into the air in the air discharge channel, when an idling stop signal for the fuel cell is input to perform an idling stop in which a hydrogen gas isolation valve is maintained open;
   increase, with an air increase means, an air mass in the air discharge channel by increasing the air which is to be supplied to the fuel cell through the air supply means and for judging whether a first air mass required for electric power production based on a current request value is less than a second air mass required for dilution when the dilution judgment means judges that the dilution has not been completed, wherein the second air mass is a constant value;
   calculate, with a power production calculation means, an amount of power production of the fuel cell based on the air mass increased by the air increase means when the air increase means judges that the first air mass is less than the second air mass;
   drive, with a fuel cell drive means, the fuel cell to produce electric power so as to obtain the amount of power production calculated by the power production calculation means; and
   charge the electrical storage means with the electric power produced during the dilution.

2. The fuel cell system according to claim 1,
   wherein the control means is further programmed to:

judge, with an electrical storage judgment means, whether the electrical storage means is able to store the electric power, and wherein the electric power produced by the fuel cell drive means is stored in the electrical storage means when the electrical storage judgment means judges that the electrical storage means is able to store the electric power.

3. A method for controlling a fuel cell system, said method comprising:

providing a fuel cell producing electric power by a reaction of hydrogen gas and air;

providing a hydrogen supply means for supplying the hydrogen gas to the fuel cell through a hydrogen supply channel;

providing a hydrogen circulation channel in which the hydrogen gas discharged from the fuel cell is introduced into the hydrogen supply channel again;

providing an air discharge channel in which the air discharged from the fuel cell flows;

judging whether a dilution process has been completed or not, in the dilution process the hydrogen gas in the hydrogen supply channel and the hydrogen circulation channel flows into the air in the air discharge channel when an idling stop signal for the fuel cell is input to perform an idling stop in which a hydrogen gas isolation valve is maintained open;

increasing an air mass in the air discharge channel by increasing the air which is to be supplied to the fuel cell when it is judged that the dilution process has not been completed;

further judging whether or not a first air mass required for electric power production based on a current request value is less than a second air mass required for dilution;

calculating an amount of power production of the fuel cell based on the air mass increased when it is judged that the first air mass is less than the second air mass;

driving the fuel cell to produce electric power so as to obtain the amount of power production calculated; and charging a battery with the electric power produced during the dilution process, wherein the second air mass is a constant value.

4. The method for a fuel cell system according to claim 3, said judging comprising:

determining that the dilution of the hydrogen gas has not been completed in a case where input of the idling stop signal for the fuel cell is at a time immediately after a purge of the hydrogen gas in the hydrogen circulation channel has started.

5. The method for a fuel cell system according to claim 3, said judging comprising:

judging whether the dilution of the hydrogen gas has been completed or not based on one of an elapsed time after a purge was previously completed or a concentration of the hydrogen gas, in a case where one of while the purge is being performed or when the purge has been completed at the time of input of the idling stop signal for the fuel cell.

6. The method for a fuel cell system according to claim 3, further comprising:

additionally judging whether the battery is ready for the charging, wherein the calculating the amount of power production of the fuel cell based on the air mass increased is performed when it is judged that the battery is ready for the charging.

* * * * *